(12) United States Patent
Penney

(10) Patent No.: US 6,530,475 B1
(45) Date of Patent: Mar. 11, 2003

(54) PORTABLE OFFICE

(76) Inventor: Joseph J. Penney, 1206 Adams Ct., Midland, MI (US) 48642

( * ) Notice: Subject to any disclaimer, the term of this patent is extended or adjusted under 35 U.S.C. 154(b) by 278 days.

(21) Appl. No.: 09/588,835

(22) Filed: Jun. 7, 2000

(51) Int. Cl.[7] ............................................... B65D 85/38
(52) U.S. Cl. ........................ 206/320; 205/576; 190/110
(58) Field of Search ................................. 206/320, 576; 190/102, 109, 110; 312/223.1, 223.2

(56) References Cited

U.S. PATENT DOCUMENTS

| | | | |
|---|---|---|---|
| 327,749 A | * | 10/1885 | Wulff ........................... 190/10 |
| 3,904,003 A | * | 9/1975 | Margerum .................... 190/11 |
| 4,258,387 A | | 3/1981 | Lemelson et al. |
| 4,669,053 A | | 5/1987 | Krenz |
| 4,693,525 A | | 9/1987 | Shinoto |
| 4,790,431 A | | 12/1988 | Reel et al. |
| 4,837,590 A | | 6/1989 | Sprague |
| 4,998,603 A | | 3/1991 | Nordstrom |
| 5,111,498 A | | 5/1992 | Guichard et al. |
| 5,214,574 A | | 5/1993 | Chang |
| 5,226,540 A | | 7/1993 | Bradbury |
| 5,232,276 A | | 8/1993 | Martin |
| 5,236,265 A | | 8/1993 | Saito et al. |
| 5,242,056 A | | 9/1993 | Zia et al. |
| D346,901 S | | 5/1994 | Dulka et al. |
| 5,437,367 A | | 8/1995 | Martin |
| 5,485,922 A | | 1/1996 | Butcher |
| 5,486,982 A | | 1/1996 | Hsu |
| 5,524,754 A | | 6/1996 | Hollingsworth |
| 5,570,780 A | | 11/1996 | Miller |
| D379,265 S | | 5/1997 | Wathen et al. |
| 5,647,484 A | | 7/1997 | Fleming |
| 5,676,223 A | | 10/1997 | Cunningham |
| 5,725,090 A | | 3/1998 | Vermillion et al. |
| 5,762,170 A | | 6/1998 | Shyr et al. |
| 5,764,475 A | | 6/1998 | LeVander |
| 5,803,323 A | | 9/1998 | Hayashi et al. |
| 5,816,725 A | | 10/1998 | Sherman et al. |
| 5,908,147 A | | 6/1999 | Chuang |
| 6,047,752 A | * | 4/2000 | Southwick ................... 150/117 |

FOREIGN PATENT DOCUMENTS

DE 9101714.9 2/1991

* cited by examiner

Primary Examiner—David T. Fidei
(74) Attorney, Agent, or Firm—Reising, Ethington, Barnes, Kisselle, Learman & McCulloch, P.C.

(57) ABSTRACT

The portable office includes a soft-sided case with six walls. The top and second side are openable. The inside of the case includes a terminal compartment, a fixed computer support shelf and a moveable printer shelf. A remote edge of the moveable printer shelf is removeably attached to the second side. A holding assembly holds the second side in an open position. A strap assembly holds the moveable printer shelf in a position parallel to and above the fixed computer shelf when the second side is open. When the second side is closed, the strap assembly holds the moveable shelf generally parallel to the second side with a printer between the second side and the moveable shelf.

13 Claims, 3 Drawing Sheets

PORTABLE OFFICE

TECHNICAL FIELD

The portable office is a soft sided bag with a laptop computer shelf, a printer shelf and a terminal compartment which permits power connections to be made in the terminal compartment and which provides one outside power cable and one outside communications cable.

BACKGROUND OF THE INVENTION

Many individuals are able to conduct business and other matters at remote locations on a laptop computer. These individuals are engaged in a large variety of businesses and professions. They include salespersons, maintenance personnel, engineers, doctors, lawyers, and others.

The laptop computer can retrieve information as well as record and process information. The retrieved information can be from the computer's internal memory, from a storage disk, or from a remote computer if a communications port is available. The recorded information can be stored on internal memory, on a disk, or sent to a remote computer. The processed information can come from any or all of the sources listed above and it can also be entered directly into the laptop computer by the individual using the computer. After processing, the processed information can be stored as set forth above. The processed information can also be printed out on a printer.

A salesperson can for example enter a request for goods or services, quote the current cost and availability information, forward the order to the factory, and print up a copy of the order for the customer.

Service personnel can for example retrieve service manuals and partsbooks, identify problems, fix the problems, or order parts.

Professionals can use all of the functions suggested above. In addition, professionals and highly qualified persons may employ the computer to analyze and reprogram other computers and control systems.

The employment of a laptop computer and printer as suggested above, at temporary locations, requires a container or containers to carry a laptop computer, printer, and other equipment. If multiple trips are required to gather the required equipment at one location, and it takes several minutes to connect the various system components together, it may become expensive in time and result in the loss of sales, customers, and clients.

A system is needed which permits all of the required components to be carried in one container. Preferably, the one container should fit under the seat on a commercial airplane. The time required to have the system components operating needs to be reduced to a minimum.

SUMMARY OF THE INVENTION

The portable office includes a six-sided case. The case has a first side wall, a bottom wall, and two end walls that are connected together. A second side wall is pivotally attached to the bottom wall. The second side wall is pivotally moveable between a closed position substantially parallel to the first side wall and an open position substantially parallel to the bottom wall. A top lid closes the case. A second side wall holding assembly holds the second side wall in an open position. A moveable shelf has a remote edge that is fixable to the second side wall by a hook and loop connector. Each of two flexible straps is connected to the second side wall adjacent to a top edge of the second side wall and to the moveable shelf adjacent to a near edge of the moveable shelf. The flexible straps hold the moveable shelf in a generally perpendicular position relative to the second side wall when the second side wall is in the open position.

Other objects and advantages of this invention will become apparent from the following description when considered in conjunction with the accompanying drawings.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
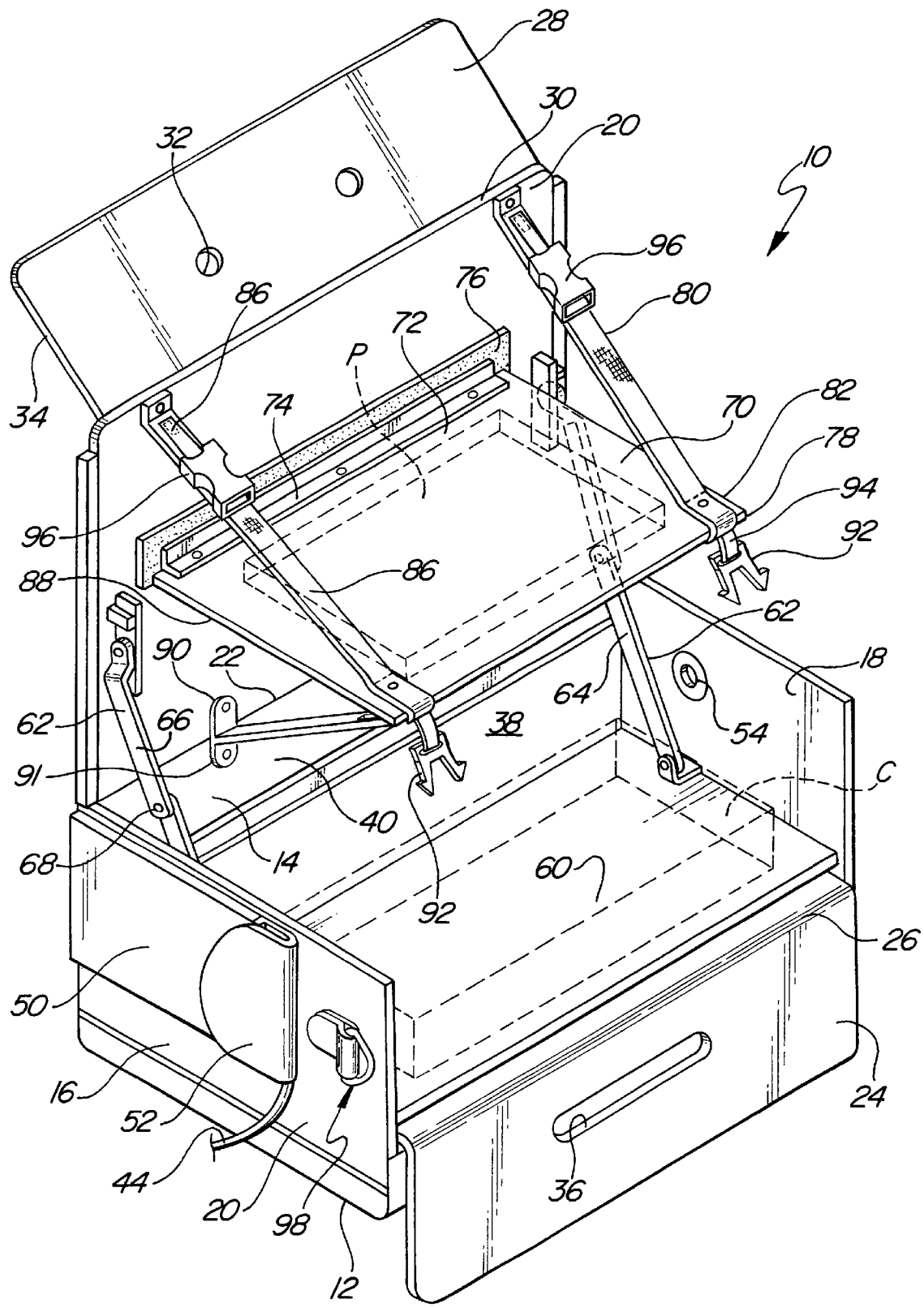
FIG. 1 is a perspective view of the portable office container opened.
Figure 4:
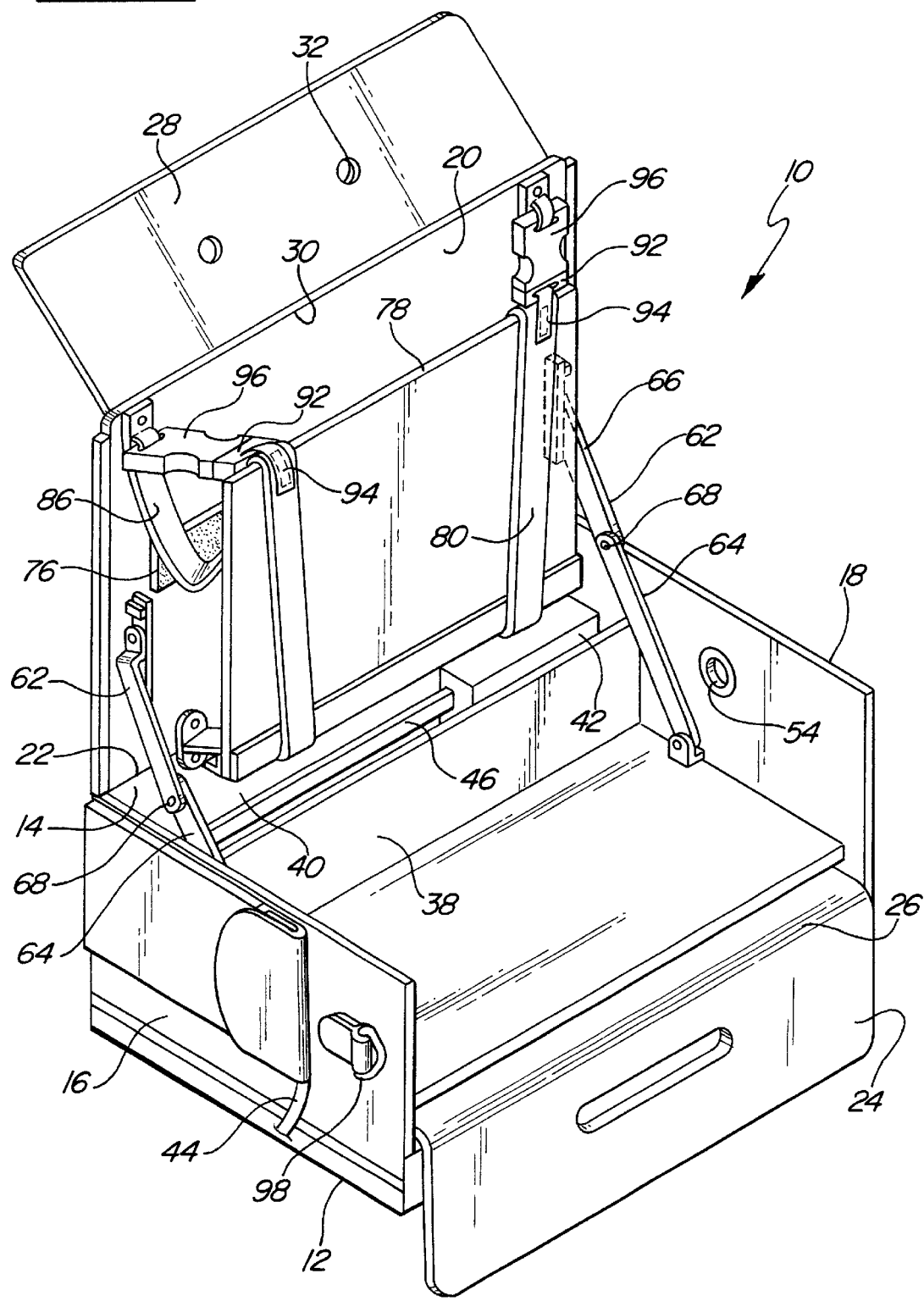
FIG. 4 is a perspective view similar to FIG. 1 with the printer shelf in a folded transport position.

The portable office stand as shown in FIGS. 1 & 4 includes a case 11 that is resting on first side 12. A bottom wall 14 and two end walls 16 & 18 are attached to the first side wall 12. The side wall 16 is attached the bottom wall 14. The side wall 18 is also attached to the bottom wall 14.

The second side wall 20 is pivotally attached to the bottom wall 14 along the bottom edge 22. A first top lid 24 is pivotally secured to the first side wall 12 by a flexible material at 26. A second top lid 28 is pivotally secured to the second side wall 22 along a top edge 30 of the second side wall. When the first top lid 24 and the second top lid 28 are both closed, a handle 32, which is secured to the second top lid 28 and extends outwardly from the back surface 34, passes through the slot 36 in the first top lid 24. The base only of the handle 32 is shown in FIGS. 1 & 4. Latch assemblies (not shown) are provided to hold the first and second top lid numbers 24 and 28 in closed positions. A handle 32 could be provided on one of the end walls 16 or 18 rather than on the top lid 24 or 28 if desired.

A transverse wall 38 is fixed to the inside surface of the first side wall 12 the end wall 16 and the end wall 18. This transverse wall 38 is parallel to and spaced from the bottom wall 14 and forms a terminal compartment 40.

An electrical terminal assembly 42 is mounted in the terminal compartment 40. A laptop computer C and a printer P can be plugged into the terminal assembly 42 in the terminal compartment 40 simultaneously. A terminal assembly 42 with more than two sets of plug-ins could be used if desired. A terminal assembly 42 with an integral surge protector could also be used if desired. The power cable 44 that supplies current to the terminal assembly 42 passes through a sheath 46 and out of the terminal compartment 40 through an aperture 48. The aperture 48 is through the end wall 16 and a wall of a power cable bag 50. When the terminal assembly 42 is not supplying current, the closing flap 52 can be opened and the power cable 44 can be coiled up and stowed in the bag 50. A laptop computer C and other components in the portable office can remain connected to the terminal assembly 42 during movement to a new location. One power cable 44 is removed from the power cable bag 50 and connected to an electrical outlet to provide current for all the powered components in the portable office.

A communications cable 51 (not shown) is connected to a laptop computer C and passes out of the portable office 10 the end through a grommet 54 in the side wall 18. An outside end of the grommet 54 is inside a communications cable bag 56 secured to the side wall 18. An outer portion of the communications cable is coiled and stowed in the communications cable bag 56. A closing flap 58 holds the communications cable 51 in the communications cable bag 56 when the cable is not connected to a telephone jack or other communications terminal. Like the power cable 44, the communications cable can remain connected to the computer during movement of the portable office to a new site.

Figure 2:
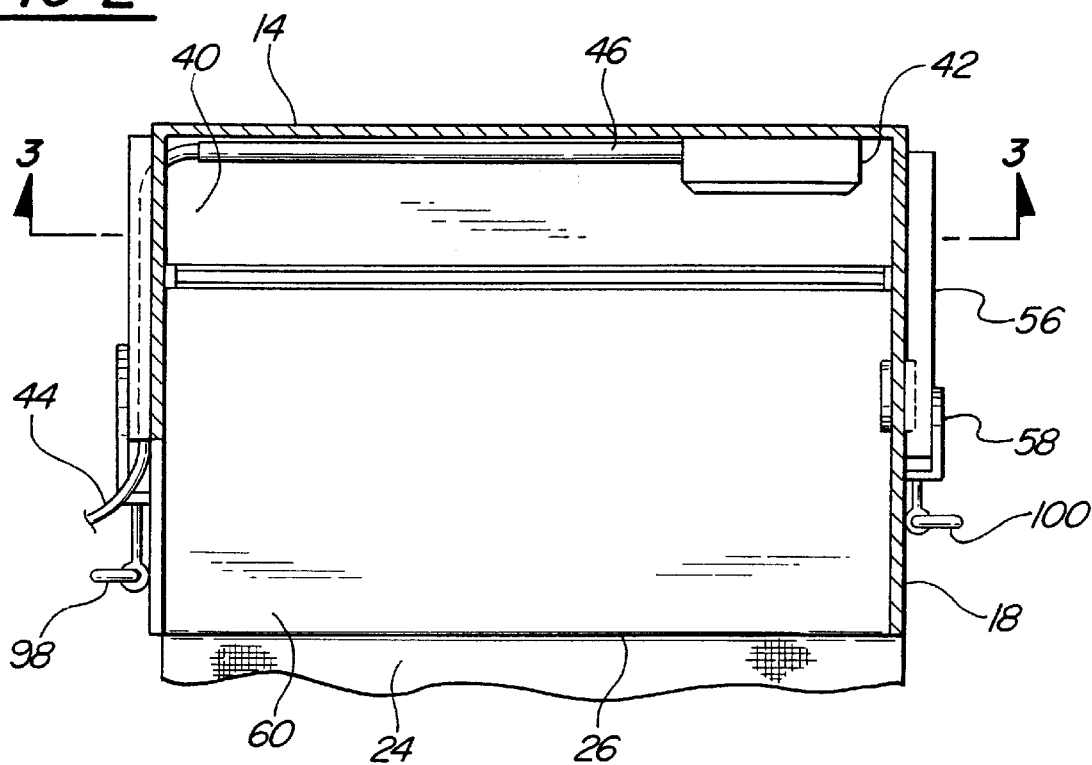
FIG. 2 is a plane view of the laptop computer support shelf and the terminal compartment.
Figure 3:
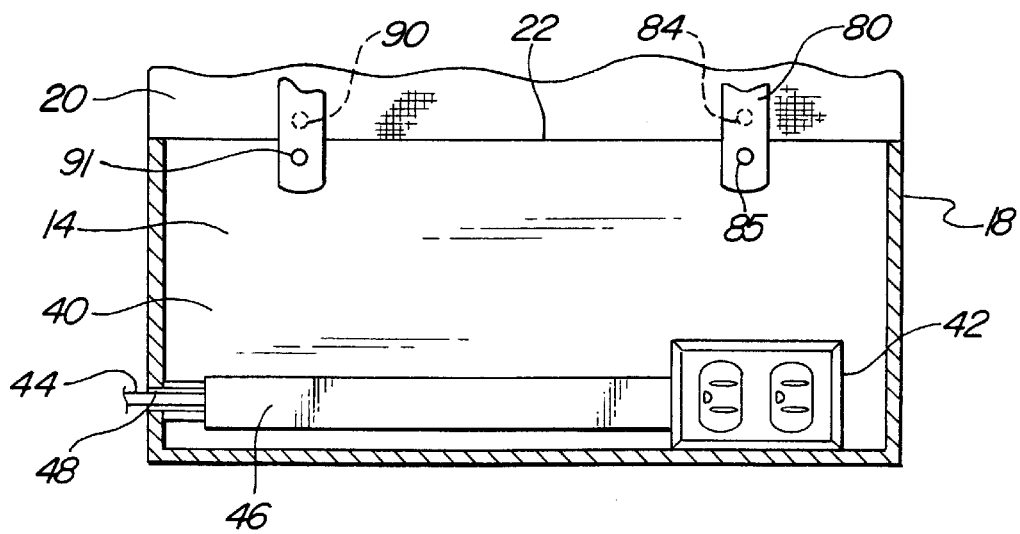
FIG. 3 is a sectional view taken along line 3—3 in FIG. 2.

A laptop computer support shelf 60 is made from a semi-rigid or rigid material that is secured to the transverse wall 38, the end wall 16 and the end wall 18. The moveable printer shelf 70 is also made from a semi-rigid or rigid material. As shown in FIGS. 1 & 2 the computer support shelf 60 is parallel to and spaced from the first side wall 12. The space between the first side wall 12 and the computer support shelf 60 provides a compartment for storing materials such as paper. The space between the support shelf 60 and the first side wall 12 also protects the computer from damage.

The second side wall 20 of the portable office 10 is held in the open position by two link holding assemblies 62. Each link assembly 62 includes a first link 64 that is pivotally attached to one of the end walls 16 and 18 and the fixed computer support shelf 60. A second link 66 is pivotally attached to the second side wall 20 and the first link 64. The pivotal connection 68 between the first link 64 and the second link 66 is locked by a detent (not shown) to hold each link assembly 62 in an extended position as shown in FIGS. 1 & 2. The link assemblies 62 can be held in extended positions by known lock assemblies other than the detents if desired. The link assemblies 62 can be replaced by a number of different holding assemblies that are capable of holding the second side wall 20 and the bottom wall 14 in a common plane.

A printer support shelf 70, as shown in FIG. 1 is a semi-rigid or rigid plate that has a remote edge 72 reinforced by an angle member 74. A first portion of a hook and loop fastener 76 is secured to the second side wall 20. Preferably the first portion of the hook and loop fastener 76 is reinforced by a rigid bar. The angle member 74 on the moveable printer shelf 70 carries an attached portion of the hook and loop fastener 76. A first flexible strap 80 is fixed to the near edge 78 of the printer support shelf 70 adjacent to a shelf side 82. The first flexible strap 80 is also fixed to the second side wall 20 above the first portion of the hook and loop fastener 76 and adjacent to the top edge 30. The first flexible strap 80 also extends from the near edge 78 to a pair of anchor points 84 and 85 on the bottom wall 14 and the second side wall 20 adjacent to the bottom edge 22.

A second flexible strap 86 is fixed to the near edge 78 of the printer support shelf 70 adjacent to a shelf side 88. The second flexible strap 86 is also fixed to the second side wall 20 above the first portion of the hook and loop fastener 76 and adjacent to the top edge 30. The second flexible strap 86 also extends from near edge 78 to a pair of anchor points 90 & 91 on the bottom wall 14 and the second side wall 20 adjacent to the bottom edge 22.

The first flexible strap 80 and the second flexible strap 86 substantially fix the position of the near edge 78 of the printer support shelf 70, relative to the second side wall 20, when the remote edge 72 of the shelf is fixed by the hook and loop fastener 76. The portions of the first and second flexible straps 80 & 86 that extend from the near edge 78 of the printer support shelf 70 to positions on the second side wall 20 adjacent to the bottom edge 22 provides sufficient slack to permit disengagement of the support shelf 70 from the portions of the hook and loop fastener 76 secured to the second side wall 20. The portions of first and second flexible straps 80 and 86 that extend from the near edge 78 of the printer support shelf 70 to positions on the second side wall 20 adjacent to the bottom edge 22 can, if desired, be separate straps attached to the support shelf and to the second side wall 20. These separate straps could be attached to the printer support shelf to adjacent to the remote edge 72.

The printer support shelf 70 is moved to a transport position by releasing the remote edge 72 from the portion of the hook and loop fastener 76 that is attached to the second side wall 20. After the remote edge 72 is released, it is lowered toward the bottom edge 22 of second side wall 20. The first and second flexible straps 80 & 86 hold the remote edge 72 close to the second side wall 22 and retain a printer P between the printer support shelf 70 and the second side wall 20. The printer P is either supported on the angle 74 or on the first and second flexible straps 80 & 86.

The portion of the first and second flexible straps 80 & 86 between the near edge 78 of the printer support shelf 70 and the top edge 30 and the second side wall 20 become loose when the shelf is in a transport position as shown in FIG. 4. The support shelf 70 is held in a position that is generally parallel to the second side wall 20 by inserting male fasteners 92 on take up straps 94 into the female couplers 96 attached to the first and second flexible straps 80 & 86.

After a printer P is secured between the printer support shelf 70 and the second side wall 20, the holding assemblies 62 are released and the second side wall is pivoted into a position in which a second side wall is generally parallel to with the first side wall and cooperates with the end wall 16 and 18 to enclose components in the portable office 10.

D-rings 98 & 100 are attached to the end walls 16 & 18. A shoulder strap (not shown) can be attached to the D-rings 98 & 100.

The disclosed embodiment is representative of a presently preferred form of the invention, but is intended to be illustrative rather than definitive thereof. The invention is defined in the claims.

What is claimed is:

1. A portable office comprising:
    a six-sided case with a first side wall, a bottom wall, a first end wall, and a second wall connected together; a second side wall pivotally attached to the bottom wall and moveable between a closed position substantially parallel to the first side wall and an open position substantially parallel to the bottom wall; a top lid; a second side wall holding assembly for holding the second side wall in the open position; a moveable shelf with a remote edge fixable to the second side wall by a hook and loop connector; and a pair of flexible straps each of which is connected to the second side wall adjacent to a top edge of the second side wall and to the moveable shelf adjacent to a near edge of the moveable shelf to hold the moveable shelf in a generally perpendicular position relative to the second side wall when the second side wall is in the open position.

2. A portable office as set forth in claim 1 including a power cable bag secured one end wall and a communications cable bag secured to another end wall.

3. A portable office as set forth in claim 1 including a transverse wall connected to the first side wall the first end wall and the second end wall, parallel to the bottom wall, and spaced from the bottom wall to form a terminal compartment.

4. A portable office as set forth in claim 3 including a power cable sheath secured in the terminal compartment.

5. A portable office as set forth in claim 3 including a fixed support shelf connected to the first end wall, the second end wall, and the transverse wall.

6. A portable office as set forth in claim 5 where in the fixed support shelf is spaced from the first side wall to form a storage compartment.

7. A portable office as set forth in claim 1 including a first flexible strap portion extending from the near edge of the moveable shelf to a first flexible strap portion anchor point adjacent to a bottom edge of the second side wall and a second flexible strap portion extending from the near edge of the moveable shelf to a second flexible strap portion anchor point adjacent to the bottom edge of the second side wall, to limit movement of the remote edge of the moveable shelf away from the second side wall.

8. A portable office as set forth in claim 7 including a take-up strap that limits movement of the near edge of the moveable shelf from the second side wall.

9. A portable office comprising:
a six-sided case with a first side wall, a bottom wall connected to a first side wall, a first end wall each of which is attached to the first side wall and to the bottom wall and a second end wall attached to the first side wall and to the bottom wall; a second side wall pivotally attached to the bottom wall and moveable between a closed position parallel to the first side wall and an open position parallel to the bottom wall; a top lid; a second side wall holding assembly for holding the second side wall in the open position; a transverse wall connected to the first side wall, the first end wall to the second end wall and parallel to the bottom wall and spaced from the bottom wall to form a terminal compartment; a fixed support shelf parallel to the first side wall, spaced from the first side wall, and fixed to the transverse wall the first end wall and the second end wall; a moveable shelf having a remote edge attachable to the second side wall by a hook and loop connector when the second side wall is in the open position, a pair of flexible straps each of which has a first end connected to the second side wall adjacent to a top edge of a second side wall, a second end connected to a flexible strap anchor point on the case adjacent to the bottom edge of the second side wall and a center portion of each flexible strap fixed to the moveable shelf adjacent to a near edge of the moveable shelf, and wherein the pair of flexible straps limit movement of the remote edge of the moveable shelf from the second side wall; and at least one take up strap connected to the moveable shelf and the second side wall to limit movement of the near edge of the moveable shelf away from the second side wall when the second side wall is in a closed position.

10. A portable office as set forth in claim 9 including a power cable sheath secured in the terminal compartment.

11. A portable office as set forth in claim 9 including a power cable bag secured to one of the first end wall.

12. A portable office as set forth in claim 9 including a communications cable bag secure to the second end wall.

13. A portable office as set forth in claim 9 including at least two take-up straps.

* * * * *